United States Patent [19]
Lin et al.

[11] Patent Number: 5,190,609
[45] Date of Patent: Mar. 2, 1993

[54] STABLE PRESSURE SENSITIVE SHRINK LABEL TECHNIQUE

[75] Inventors: Kenneth S. C. Lin, San Marino, Calif.; Roderick T. Coward, Mississauga, Canada; Douglas W. Wilson, Covina, Calif.

[73] Assignee: Avery Dennison Corporation, Pasadena, Calif.

[21] Appl. No.: 679,222

[22] Filed: Apr. 2, 1991

[51] Int. Cl.$^5$ .............................................. B32B 31/26
[52] U.S. Cl. ................................ 156/85; 156/86; 156/247; 156/267; 156/277
[58] Field of Search ............... 156/84, 85, 86, 267, 156/541, DIG. 6, DIG. 9, DIG. 14, DIG. 20, 277, 247

[56] References Cited

U.S. PATENT DOCUMENTS

| | | | |
|---|---|---|---|
| 3,032,463 | 5/1962 | Morgan | 156/267 |
| 3,873,018 | 3/1975 | Donney | 156/86 |
| 4,013,494 | 3/1977 | Patterson | 156/86 |
| 4,233,331 | 11/1980 | Lemke et al. | 156/85 |
| 4,392,898 | 7/1983 | Pithouse et al. | 156/86 |

*Primary Examiner*—Caleb Weston
*Attorney, Agent, or Firm*—Poms, Smith, Lande & Rose

[57] ABSTRACT

Heat shrinkable labels formed of a polyolefin such as polypropylene have a permanent acrylic pressure sensitive adhesive on one surface thereof, and may be mounted on a release coated backing strip. A metallization layer and open style graphics may be applied to the labels, and the graphics may be protected by varnish or a second layer of heat shrinkable polyolefin material. The label has low shrink-back properties under high ambient temperature storage conditions, following application to a product, of less than three percent.

11 Claims, 2 Drawing Sheets

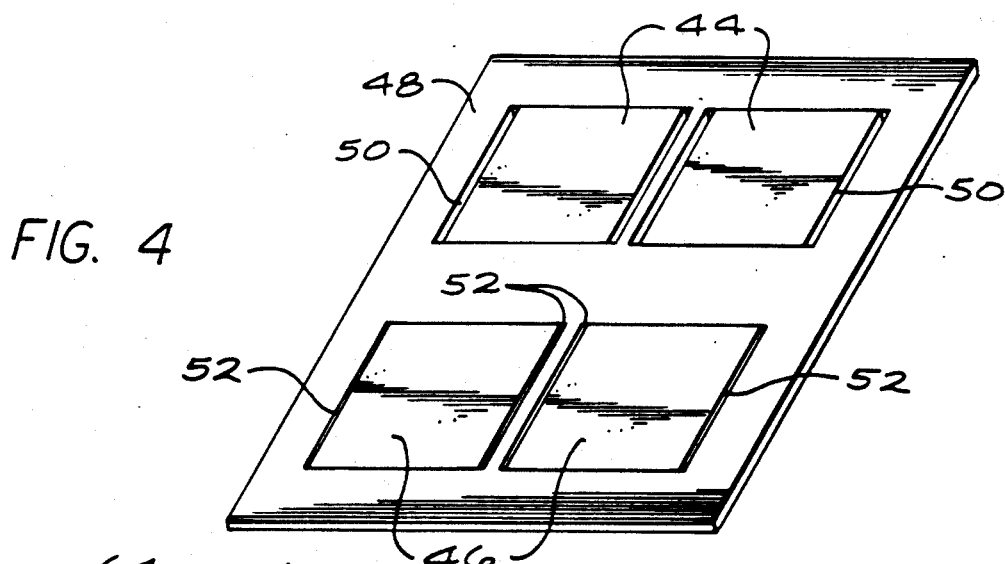
FIG. 4
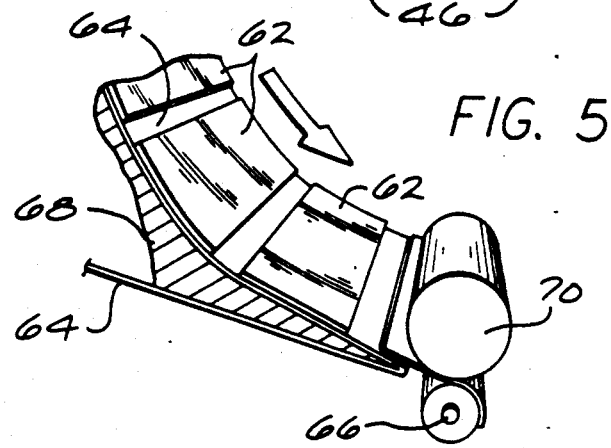
FIG. 5
FIG. 6
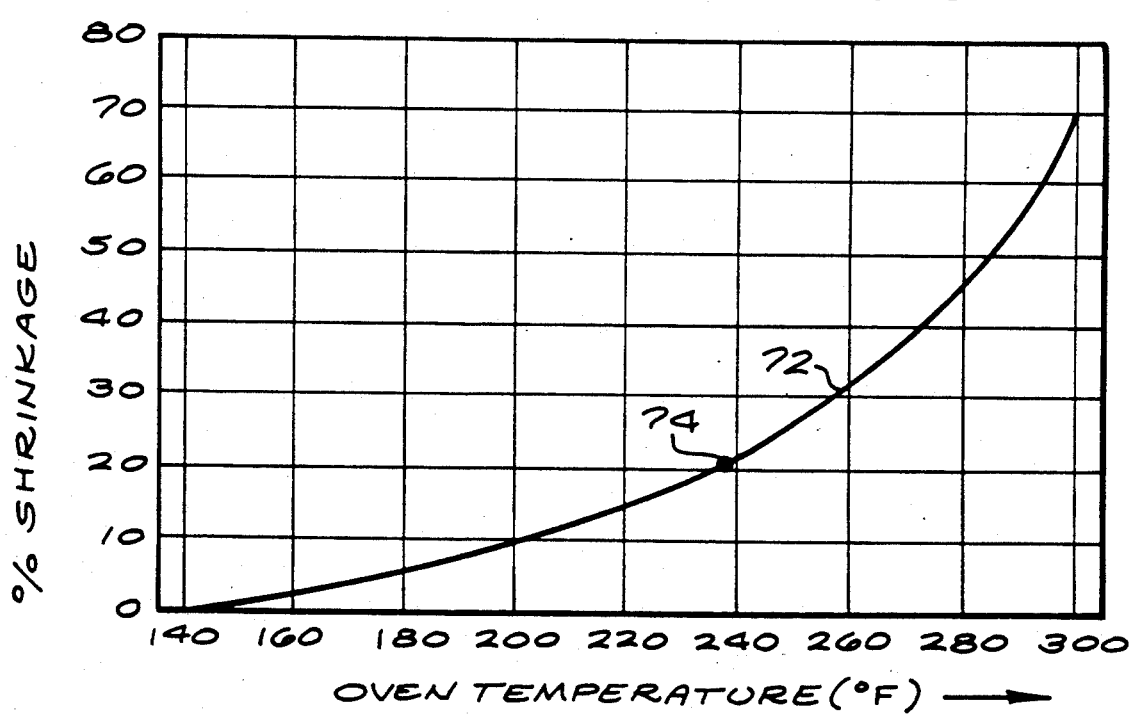

STABLE PRESSURE SENSITIVE SHRINK LABEL TECHNIQUE

FIELD OF THE INVENTION

This invention relates to shrink labels which may be applied to products and subsequently, when heat is applied to the labels, they will shrink in size to the desired final configuration.

BACKGROUND OF THE INVENTION

Shrink labels have previously been formed from polyvinyl chloride (PVC). However, PVC plastic is not favored from an environmental standpoint, in view of the presence of chlorine in its composition. In addition, its relatively high density makes for correspondingly high costs for labels of a given thickness. Further, following initial shrinking of the PVC labels onto the product, relatively high ambient temperatures, which may be encountered in storing the products, causes further undesired shrinkage; and the PVC labels are therefore undesirable for many products.

Accordingly, a principal object of the present invention is to provide an improved shrink label product which is (1) environmentally friendly, (2) has a lower density and is therefore less costly than prior known PVC labels and (3) is stable on heat aging.

SUMMARY OF THE INVENTION

In accordance with a specific method illustrating the principles of the invention, pressure sensitive shrink labels are formed using polypropylene film which shrinks in one dimension by at least 20 to 50 percent at temperatures of about 240 degress F. to about 280 degrees F., and the label stock is coated with a permanent pressure sensitive adhesive and mounted on a backing sheet which is coated with a release layer. Suitable indicia may be applied to the labels in the course of the foregoing process. The labels may then be applied to products, using a conventional peeling blade method, and are subjected to elevated temperatures in the vicinity of 240° F. to permanently shrink the labels onto the product. Then the product may be stored at relatively high ambient temperatures, such as, for example, 160° F. for 24 hours, with further shrinkage or shrink-back being less than about two or three percent.

In accordance with a broader aspect of the invention, a label assembly includes a backing strip with a release coating thereon, and a series of shrinkable polyolefin labels mounted on the backing strip, with the labels being coated with a permanent pressure sensitive adhesive.

The polyolefin label material is preferably shrinkable polypropylene, with a normal shrinkage of approximately 20 to 50 percent at temperatures in the range of about 240 degrees F. to 280 degrees F. In addition, it has a relatively low shrink-back property after having been applied to a product, in the order of less than 3 percent.

The pressure sensitive adhesive is preferably a permanent pressure sensitive adhesive, and an acrylic adhesive is preferred.

The label may be laminated and may include metalization and printed graphics between the two laminations. A laminating adhesive is employed to secure the two layers together; and the laminating adhesive may be any flexible adhesive which provides proper bonding between the outer laminating film and the base portion of the label. The laminating adhesive must be flexible and have a strong bond to accommodate the dimensional changes during shrinking.

Alternatively, only a single layer of shrinkable polyolefin material may be used, and the graphics may be applied to the upper surface thereof, with a suitable varnish or other protective layer applied over the graphics for protection.

Advantages of the new shrink label include (1) a more environmentally friendly product which does not include chlorine, (2) lower cost of product because polypropylene is approximately ⅓ lighter or less dense than the polyvinyl chloride shrinkable labels which were previously used, and (3) the polypropylene labels have less shrink-back, or shrinkage after having been applied, under high ambient temperature storage conditions.

Other objects, features and advantages will be developed in the course of the following detailed description and from a consideration of the accompanying drawing.

BRIEF DESCRIPTION OF THE DRAWINGS

FIG. 4 illustrates comparative tests using polypropylene labels and PVC labels, following a "shrink-back" test;

FIG. 5 shows the application of shrinkable labels to a product such as a small battery; and FIG. 6 is a plot of percentage shrinkage against oven temperature for the polyolefin labels of the present invention.

BRIEF DESCRIPTION OF PREFERRED EMBODIMENTS

Figure 1:
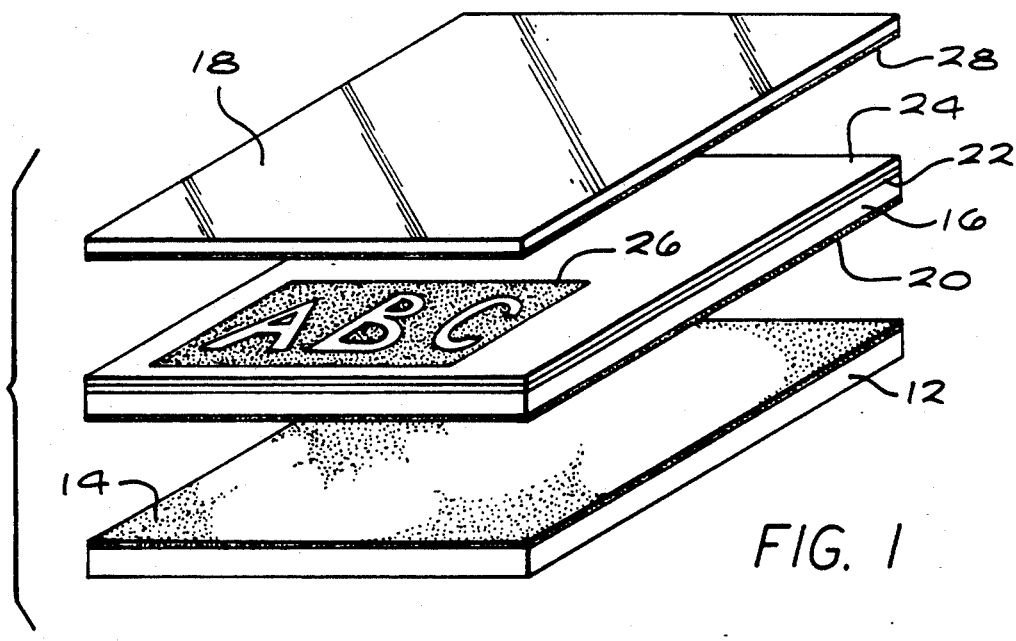
FIG. 1 is an exploded view of a label illustrating the principles of the present invention.

Referring now to the drawings, FIG. 1 is an exploded view of a multiple layer label illustrating the principles of the present invention. Starting from the bottom, the backing sheet 12 has a very thin release layer 14, normally silicone, coated onto it. The label per se is formed of two layers 16 and 18, of shrinkable polyolefin such as polypropylene.

Shrinkable plastic films are formed by stretching plastic film material under somewhat elevated temperature conditions, and then quenching the film, or rapidly lowering its temperature. Subsequently, when relative high temperature is applied to the film, it will shrink along the direction in which it has been stretched. In the present case, the shrinkable polypropylene film may be purchased under the designation "XPP-XL13", from Exxon Chemical Company, P.O. Box 3272, Houston, TX 77253-3272.

A layer of permanent pressure sensitive adhesive 20 is applied to the lower surface of the layer 16 of the label. The adhesive layer 20 will cause the layer 16 to adhere to the backing sheet 12 but only lightly, in view of the presence of the release layer 14. The permanent pressure sensitive adhesive may be an acrylic adhesive sold under the designation Aroset 1860-2-45 by Ashland Chemical Company, 5200 Blazer Parkway, Dublin, Ohio 43017. Other permanent pressure sensitive adhesives, such as rubber based adhesives, may also be employed. With regard to types of adhesives which are known as "permanent" pressure sensitive adhesives, using standard measuring techniques in accordance with Pressure Sensitive Tape Council Standards, permanent adhesives normally have a peel force of 2 or 3 or more pounds per one inch strip, measured when the tape is being pulled off perpendicular to the orientation of the tape from a stainless steel base member, while removable self-adhesive or pressure sensitive adhesive materials normally have a peel force less than about 1.5 pounds.

Returning to FIG. 1, a metalization layer 22 may be applied to the upper or lower surface of the shrinkable polypropylene layer 16. If applied to the lower surface, it would of course be above the adhesive layer 20, as shown in FIG. 1. The metalization process is commonly used in the film industry, and involves the deposition of a thin layer of metal vapor on a plastic film to achieve a mirror-like appearance of the film. In the present case metalization of the film provides enhanced label graphic appearance. One of a number of metalizing facilities providing this service is Dunmore Corporation at Newtown Industrial Commons, Penn's Trail, Newtown, Pa. The preferred metallization is aluminum, but other metals may be employed.

Graphics, as indicated by the layer 24 may be applied to the label 16, on top of the metalization layer 22. By making partially open types of letters or other graphics, as indicated at reference numeral 26, the metalization layer is visible through the openings in the printed graphics and makes for an interesting and pleasing appearance.

The upper polypropylene layer 18 has its shrinkable direction aligned with that of base label, and may be adhered to the layer 16 by a suitable laminating adhesive 28 which may be a flexible adhesive which would provide secure bonding between the laminating film and the remainder of the label, during shrinkage which is one of the steps which will occur. The pressure sensitive acrylic adhesives mentioned above may be used. Alternatively, other known permanent laminating adhesives or pressure sensitive adhesives, including rubber based adhesives, may be used.

Figure 2:
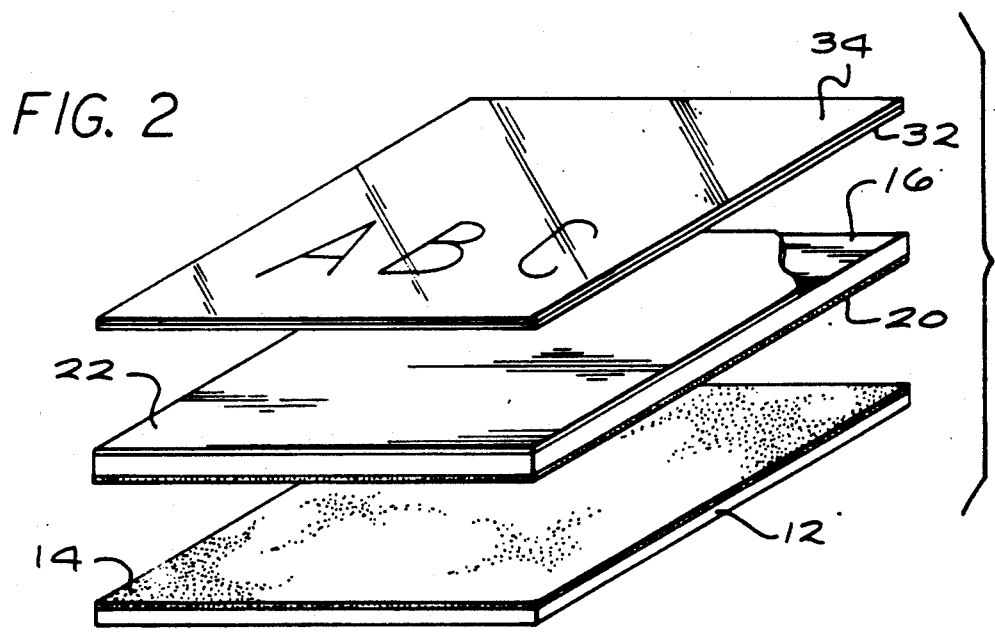
FIG. 2 shows an alternative, simpler shrinkable label configuration.

FIG. 2 shows a simpler construction in which only one layer 16 of shrinkable polyolefin is used. The graphics layer is indicated by the reference numeral 32 and an upper transparent layer 34 of varnish is provided to protect the graphics.

Figure 3:
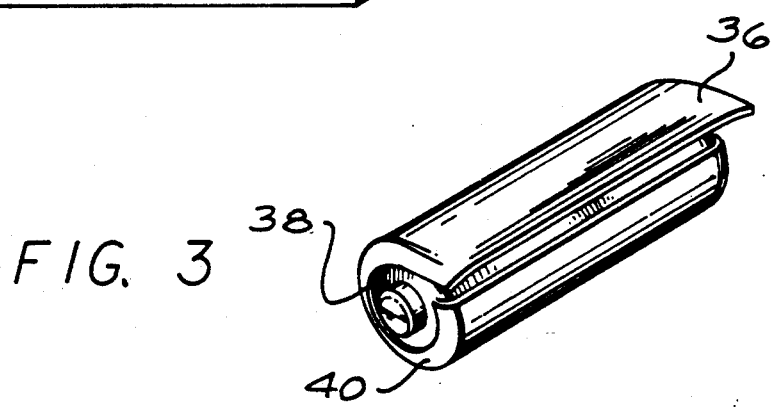
FIG. 3 shows a shrink wrap film applied to a small battery cell.

FIG. 3 shows a shrink label 36 applied to a battery 38. The label 36 is shown partly unrolled, for ease of visualization, but the end 40 of the label is shown as it would be following a heat treatment, when the label 36 is shrunk onto and partially encloses the ends of the battery, as well as fitting tightly around the battery in the central area thereof.

FIG. 4 shows two labels 44 which are formed of polyvinyl chloride film material, and two labels 46 which are formed of a polypropylene film. The two sets of labels were mounted on a metal plate 48. The labels on the test plate 48 have been applied and initially heat treated at an elevated temperature in the order of 240° F. or 250° F. Following this initial shrinking step, a shrink-back test was conducted as follows. The plate with the applied labels as shown in FIG. 4 was held at an elevated temperature of approximately 160° F. for 24 hours. This test was in the nature of an accelerated elevated temperature storage test which would simulate a storage at a fairly high temperature such as 120° F., which might be encountered in a storage warehouse, for a longer period of time such as a year, for example. The results of the test are indicated by the spaces 50 at each side of the upper set of PVC labels 44; and this indicates the undesirably large shrink back of PVC shrink labels. On the other hand, very little shrink-back is found along the edges 52 of the lower labels which employed polypropylene. More specifically, the upper labels shrank back at least 3/32 inch or ⅛ inch over the two inch width of the labels, while the lower set of polypropylene labels 46 shrank back by a distance of less than 1/32 of an inch. In each case, the width of the labels was two inches. Using the ratio of ⅛ to two inches, which is equal to 16/8, the shrink-back for the PVC shrinkable labels was approximately 1/16 or 6 percent, while for the polypropylene labels, the shrinkage of approximately 1/32 of an inch was approximately 1.6 percent. Accordingly, the shrink-back qualities of the polyolefin film is much less than, and is therefore far superior to that of the PVC film. Further, it is noted that the high shrink-back of the PVC shrinkable film label was such that these labels were not acceptable for some commercial applications. Incidentally, as used in the present specification and claims, the discussion of shrink back under "relatively high ambient temperatures for prolonged periods of time" refers to storage at temperature-time conditions comparable to storage at 160° F. for 24 hours, such as storage in a warehouse at a temperature of a fairly high temperature, such as 120° F. for a longer period of time, such as a year, for example.

FIG. 5 shows the application of label 62 from a backing sheet 64 to a product 66 using a peeling blade 68 and a roller 70. FIG. 5 indicates the conventional manner in which labels 62 mounted on a backing sheet 64 are applied to products. Incidentally, in the normal course of label fabrication, a roll of a release coated liner or backing material is further coated with pressure sensitive adhesive and then the polypropylene label stock would be layered onto the adhesive and release coated backing strip. The labels are then die cut and the waste label stock removed, with the appearance of the resulting labels on the backing strip then being substantially as shown in FIG. 5. The pressure sensitive adhesive is coated onto the backing sheet instead of onto the polypropylene, in view of the normal heating of the adhesive to speed up drying, which could shrink the polypropylene to some extent. If an adhesive coating process were used which did not involve heating, the pressure sensitive adhesive could be coated onto the polypropylene.

FIG. 6 is a plot of the percentage shrinkage versus oven temperature, for the polypropylene film identified hereinabove. The plot 72 is the average of a number of test runs which were made on this type of film. Normally, a shrinkage of approximately 20 percent, as indicated by the point 74 on the plot 72, is acceptable, and this may be achieved by temperatures in the order of 240° F. or 250° F.

Concerning the thickness of the layers of shrinkable material, it is noted that varying thicknesses may be used depending on the label requirements, but normally, for a single polypropylene layer as in FIG. 2, the preferred thickness would be about 0.002 inch or 2 mils, while for a two layer label as in FIG. 1, the thickness of each layer would be about 1.25 mils.

It is further noted that, for a two mil film, one pound of polyvinyl chloride would extend over 10.2 thousand square inches, while polypropylene would extend over 15.3 thousand square inches. Thus, with the price per pound of the two materials being comparable, the lower density of polypropylene makes for significantly lower materials cost for comparable thickness labels.

In conclusion, it is to be understood that the foregoing detailed description and the accompanying drawings relate to preferred illustrative embodiments of the invention. Various modifications and alternatives may be employed without departing from the spirit and scope of the invention. Thus, by way of example and not of limitation, the shrinkable film may be formed of other polyolefin materials such as polyethylene, in addition to polypropylene, and other known label configurations may be employed using the shrinkable film as disclosed herein. Accordingly, the present invention is not limited precisely to the method and structure as described hereinabove and as shown in the drawings.

What is claimed is:

1. A method relating to shrinkable labels, comprising the steps of:
   (a) forming a shrinkable film consisting essentially of polypropylene, said film being heat shrinkable in one direction by at least 20 percent at elevated temperatures;
   (b) mounting the polypropylene film on a strip of flexible backing tape with a release coating thereon, utilizing a layer of permanent pressure sensitive film between the film and the backing tape;
   (c) applying graphics to said polypropylene film;
   (d) forming said adhesive coated film into individual labels mounted on said backing tape;
   (e) applying said labels to products;
   (f) heating said labels to a temperature in the order of 240 degrees F to 250 degrees F to shrink said labels by about 20 percent or more; and
   (g) storing said products with the shrinkable labels applied thereto for prolonged periods at relatively high ambient temperatures, with the shrink back of said labels following such storage being less than three percent.

2. A method relating to shrinkable labels, comprising the steps of:
   (a) forming shrinkable film consisting essentially of polypropylene;
   (b) mounting said film on a strip of flexible backing tape with a release coating thereon, utilizing a layer of permanent pressure sensitive adhesive between the film and the backing strip, said film being heat shrinkable in one direction by at least 20 percent at elevated temperatures;
   (c) applying graphics to said film; and
   (d) forming said film into individual labels mounted on said backing tape;
   whereby, when said labels are applied to products and heated to an elevated temperature to shrink said labels by more than 20 percent onto the products, said products have the property that in the event they are stored with the shrinkable labels applied thereto for prolonged periods at relatively high ambient temperatures, the shrink back of said labels following such storage is less than three percent.

3. A method as set forth in claim 2 wherein said polyolefin film consists essentially of polypropylene.

4. A method as set forth in claim 2 wherein said labels are initially heated to a temperature in the vicinity of 240 degrees to 250 degrees.

5. A method as defined in claim 2 including the step of metallizing said film, with said graphics being subsequently applied to said film.

6. A method as defined in claim 2 including the additional step of protecting said graphics by the application of an additional layer over said graphics.

7. A method as defined in claim 6 wherein said protecting step includes the application of an additional film of shrinkable film consisting essentially of polypropylene.

8. A method as defined in claim 7 including securing said additional film by a laminating adhesive.

9. A method as defined in claim 7 wherein said protecting step includes the application of a coating of varnish.

10. A method as defined in claim 2 including the step of applying said adhesive to said backing tape prior to mounting said film onto said tape.

11. A method relating to shrinkable labels comprising the steps of:
    preparing a flexible backing strip having a release coating thereon;
    locating a plurality of heat shrinkable labels formed predominantly of polypropylene polypropylene film which is heat shrinkable in one direction by at least 20 percent at elevated temperatures;
    utilizing permanent pressure sensitive adhesive to mount said labels on said backing strip; and
    applying graphics to said film.

* * * * *